United States Patent [19]
Hsu

[11] Patent Number: 5,931,950
[45] Date of Patent: Aug. 3, 1999

[54] WAKE-UP-ON-RING POWER CONSERVATION FOR HOST SIGNAL PROCESSING COMMUNICATION SYSTEM

[75] Inventor: T. J. Hsu, Pleasanton, Calif.

[73] Assignee: PC-Tel, Inc., San Jose, Calif.

[21] Appl. No.: 08/877,129

[22] Filed: Jun. 17, 1997

[51] Int. Cl.[6] ............................... G06F 1/00; H04B 1/38; H04M 11/00
[52] U.S. Cl. .................. 713/300; 713/320; 713/323; 375/222; 379/102.04
[58] Field of Search ........................... 379/93.36, 102.04; 375/222; 713/300, 320, 323, 324, 330, 340

[56] References Cited

U.S. PATENT DOCUMENTS

| | | | |
|---|---|---|---|
| 4,656,318 | 4/1987 | Noyes | 379/93 |
| 4,951,309 | 8/1990 | Gross | 379/98 |
| 4,965,641 | 10/1990 | Blackwell et al. | 375/7 |
| 5,410,713 | 4/1995 | White | 379/102.04 |
| 5,588,054 | 12/1996 | Shin et al. | 379/413 |
| 5,678,059 | 10/1997 | Ramaswamy et al. | 395/821 |
| 5,721,830 | 2/1998 | Yeh et al. | 395/200.67 |
| 5,765,021 | 6/1998 | Hsu | 395/828 |

*Primary Examiner*—Ayaz R. Sheikh
*Assistant Examiner*—Xuong M. Chung-Trans
*Attorney, Agent, or Firm*—Skjerven, Morrill, MacPherson, Franklin & Friel LLP; David T. Millers

[57] ABSTRACT

An communication system such as a host signal processing modem includes a host computer and a device that is coupled to communication lines and a host processor in the host computer. In a normal operating mode, the device generates periodic interrupts that cause the host processor to execute a software portion of the communication system. The software portion communicates with the device and implements protocols required to maintain communications with a remote system via communication lines. In a wait mode of the device, interrupts from the device to the host processor are suspended and selection logic in the device selects a communication signal such as a ring signal from the telephone lines as an interrupt to the host processor. While in wait mode, a power management system can place the system in a sleep mode because the periodic interrupts are suspended and do not indicate system activity that would prevent use of the sleep mode. However, since an incoming ring signal interrupts the host processor, the HSP communication system can activate and respond to an incoming communication even if the device is in the wait mode when the incoming communication is initiated.

15 Claims, 2 Drawing Sheets

WAKE-UP-ON-RING POWER CONSERVATION FOR HOST SIGNAL PROCESSING COMMUNICATION SYSTEM

BACKGROUND

1. Field of the Invention

This invention relates to computers employing power management systems and particularly to circuits and methods for allowing a computer to enter a power conserving mode while executing a host signal processing modem.

2. Description of Related Art

Host signal processing (HSP) modems reduce the cost of providing modem functions to a computer system by utilizing the processing power of the central processing unit (CPU) of a host computer rather than including a dedicated digital signal processor (DSP) in modem hardware. For example, typical HSP modem hardware includes: an interface for connection to telephone lines; a digital-to-analog converter (DAC); an analog-to-digital converter (ADC); a buffer for temporary storage of samples representing signals transmitted and received on the telephone lines; and an interface for connection to the host computer. During operation with an active connection over the telephone lines, the HSP modem hardware periodically interrupts the host CPU which in response executes HSP modem software. The HSP modem software retrieves received samples from the HSP modem hardware and converts the received samples to data for a communications application. The HSP modem software also retrieves data from the communications application, converts the data into samples representing the signal to be transmitted on the telephone lines, and writes those samples to the HSP modem hardware.

In an HSP modem, the host computer executes software which performs many of the conversions performed by hardware in a conventional modem. Hardware in the HSP modem performs simple analog-to-digital and digital-to-analog conversions such as converting a received analog communication signal to a series of digital samples which represent amplitudes of the received signal. The host computer executes software which interprets the samples according to a communications protocol and derives the desired data from the samples. The host computer also generates a series of output samples which represent amplitudes of a transmitted analog communication signal in compliance with the protocol, and hardware of the HSP modem converts the output samples into the transmitted signal.

One disadvantage of an HSP modem can arise from the interaction of the HSP modem with a power management system such as often employed to conserve battery power in a portable computer. One type of power management system tracks a computer's activity and when the computer is inactive for a predetermined period, places the computer in a power-saving (sleep) mode in which the system clock for the central processing unit (CPU) is slowed or stopped. The power management system turns on or increases the frequency of the system clock to place the computer in a normal operating mode when the computer resumes activity. An HSP modem can effectively disable a power management system by maintaining periodic interrupts to the main CPU. The power management system senses the periodic interrupts as system activity and keeps the computer in a normal operating mode. This is appropriate during an active telephone connection because the system is actively processing information and probably should not be in the power-saving mode. But, when there is no active modem connection, the HSP modem and the computer system may not be performing any useful activity, and the computer should be place in power-saving mode to conserve power. The HSP modem can be turned off to stop the periodic interrupts and allow the system to enter sleep mode, but this comes at the cost of losing modem functions. For example, while there is no active connection, the HSP modem may be waiting for a remote device to call in and establish a connection. Turning off the HSP modem disables the ability to handle an incoming call. Accordingly, an HSP modem system is sought that allows a power management system to place a computer in a power-saving mode when there is no active connection and is still able to respond to incoming calls received while in the power-saving mode.

SUMMARY

In accordance with the invention, an HSP modem or other HSP communication system includes a device that connects to telephone or other communication lines and is operable in a normal mode and a wait mode. In the normal mode, the device generates periodic interrupts of the host processor; and in response to the periodic interrupts, a host CPU executes software for processing information transferred via the device. In the wait mode, periodic interrupts to the host CPU are suspended but a communication interface such as a DAA (digital/analog adapter) circuit is active and interrupts the host computer for an incoming signal on the communication lines. Accordingly, while in wait mode, the device does not generate periodic interrupt activity, and a power management system can place the host CPU in a power-saving mode while waiting for an incoming communication signal. In response to the incoming signal, the device is switched to the normal mode in which the device generates periodic interrupts to the host CPU for processing information transferred via a newly created modem connection. The interrupts cause the power management system to switch the host CPU back to normal operating mode if the host CPU was operating in power-saving mode. Accordingly, a computer system can be in a power-saving mode while waiting for an incoming ring signal and still respond to the ring signal to establish a modem connection.

One HSP modem system in accordance with the invention is implemented using a multiplexer and an HSP modem integrated circuit (IC). An interrupt signal from the HSP modem IC and a ring signal from DAA circuit provide input signals to the multiplexer. The output terminal of the multiplexer is coupled to an interrupt line of the host processor. To place the HSP modem hardware in the wait mode, the HSP modem IC is shut off or idled and the multiplexer selects the ring signal as an interrupt to the host processor. Shutting off the HSP modem IC halts periodic interrupts to the host processor and allows a power-conservation system to switch the host processor to power-saving mode. In the wait mode, a ring signal interrupts the host processor causing the host processor to execute HSP modem software. The HSP modem software turns on the HSP modem IC and causes the multiplexer to provide the interrupts from the HSP modem IC to the host processor.

HSP modems or communication systems according to embodiments of the invention may also include a time-out counter either in software or in hardware that places the HSP modem hardware in wait mode after a predetermined period with no incoming signal from a communication line and no service request from a communication application. The HSP modem hardware reactivates in response to a ring signal for an incoming call or the host computer writing to the configuration register when the host computer initiates a modem connection.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an aspect of the invention, a host signal processing (HSP) modem can be placed in a wait mode to suppress interrupts from HSP modem hardware to a host computer, thus allowing the host computer to enter a power-saving mode while the HSP modem waits for an incoming call. A ring signal for the incoming signal is connected to interrupt the host computer when an incoming call is received. The HSP modem can then switch back to a normal operating mode in response to the ring signal or in response to the host computer directing the HSP modem to resume normal operations.

Figure 1:
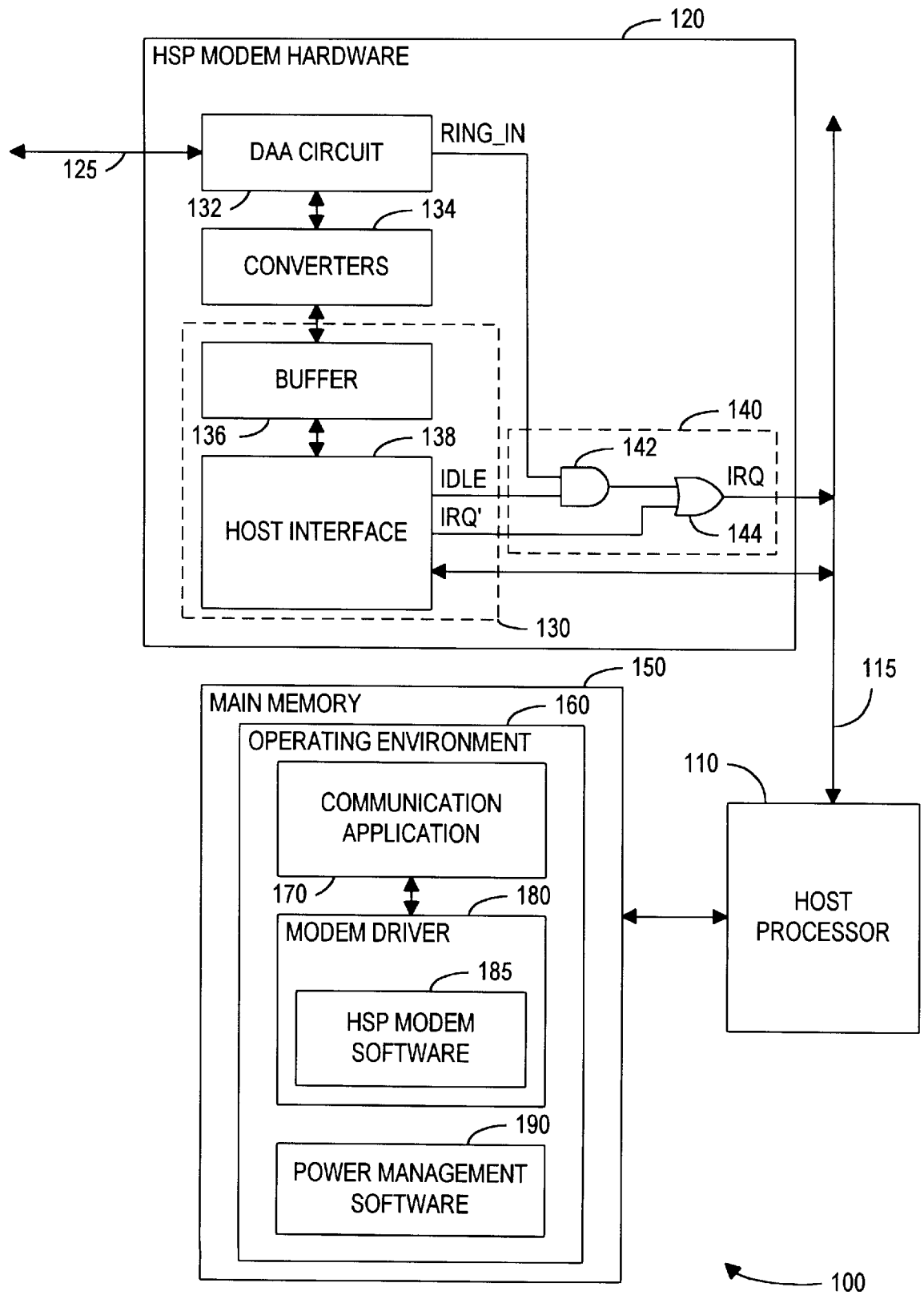
FIG. 1 shows a diagram of a computer system including a host signal processing modem in accordance with an embodiment of the invention.

FIG. 1 illustrates a computer system 100 including a host signal processing (HSP) modem in accordance with an embodiment of the invention. Computer system 100 includes a main or host processor 110 connected to HSP modem hardware 120 via a device bus 115. In an exemplary embodiment of the invention, computer 100 is an IBM compatible personal computer, host processor 110 is an x86 compatible microprocessor such as a PENTIUM® (a trademark of Intel Corp.), and device bus 115 is an ISA bus implemented by a mother board containing host processor 110 and a main memory 150. Resident in main memory 150 and executed by host processor 110 is an operating environment 160 for software including applications such as a communication application 170 and device drivers such as a modem driver 180. In the exemplary embodiment, operating environment 160 is the WINDOWS95® (a trademark of Microsoft, Inc.) operating system and modem driver 180 is a COM driver for that operating system.

HSP modem hardware 120 includes a digital/analog adapter (DAA) circuit 132, converters 134, a buffer 136, a host interface 138, and selection logic 140.

DAA circuit 132 is between communication (e.g., telephone) lines 125 and converters 134 and provides an interface for reception and transmission of analog signals on lines 125. For telephone lines, DAA circuit 132 handles ring detection and line connection and hang up. Converters 134 convert an analog signal from DAA circuit 132 to input digital samples that are stored in buffer 136 and converts output digital samples from buffer 136 to an analog signal for transmission on lines 125 via DAA circuit 132. In the exemplary embodiment of the invention, buffer 136 is a circular buffer such as described in co-owned U.S. Pat. No. 5,721,830, entitled "Host Signal Processing Communication System that Compensates for Missed Execution of Signal Maintenance Procedures," which is incorporated by reference herein in its entirety. With a circular buffer, converters 134 can repeatedly convert the same output digital samples to maintain a suitable carrier signal even when no new output digital samples are available. Accordingly, HSP modem hardware 120 can keep a remote device from disconnecting even when HSP modem software 185 is unable to provide the required output samples.

Host interface 138 is coupled to buffer 136 and provides an interface that allows host processor 110 to read input digital samples from and write output digital samples to buffer 136. During a normal operating mode, host interface 138 periodically generates an interrupt to host processor 110, and host processor 110 responds to an interrupt by executing an interrupt routine from HSP software 185 in modem driver 180. In the exemplary embodiment, for example, such interrupts are generated every 3.3 ms, and during each interrupt HSP modem software reads 24 input samples from buffer 136 and writes 24 output samples to buffer 136. More generally, the number of samples read or written per interrupt is about equal to the product of the period of the interrupts and a sampling frequency used by converters 134.

Modem driver 180 contains HSP modem software 185 and may additionally include a UART emulation such as described in U.S. patent application Ser. No. 08/428,935, entitled "Communications Interface and Conflict Avoidance Using a Software Simulation of a UART," filed Apr. 25, 1995, which is hereby incorporated by reference herein in its entirety. A UART emulation emulates the register set and timing responses required for a UART communicating with operating environment 160 and converts information formats as required to transfer information between operating environment 160 and host interface 138. With a UART emulation, host interface 138 can have any desired interface suitable for HSP modem hardware 120 and still occupy an I/O slot that operating environment 160 normally reserves for device having a UART compatible interface and register set.

In accordance with an aspect of the invention, HSP modem hardware 120 is placed in wait mode where host interface 138 is idled and logic 140 connects an incoming ring signal RING_IN from lines 125 via DAA circuit 132 as an interrupt to host processor 110. To place HSP modem hardware 120 in wait mode, HSP modem software 185 writes to a configuration register in host interface 138, and in response, host interface 138 stops generating periodic interrupts and asserts a signal IDLE to logic 140. DAA circuit 132 remains active in the wait mode which differs from an off state where hardware 120 is powered down. Signal IDLE causes logic 140 to pass signal RING_IN to host processor 110 on an interrupt line of device bus 115. Since HSP hardware 120 is not periodically interrupting host processor 110, computer system 100 can enter a power-saving or sleep mode if computer system 100 is otherwise inactive for a sufficient period of time. However, an incoming ring signal from lines 125 interrupts host processor 110 and causes host processor 110 to execute a routine in HSP modem software 185 so that HSP modem hardware 120 can be reactivated and handle the incoming call. If a communication application 170 directs modem driver 180 to initiate a connection over lines 125 while HSP modem hardware 120 is in wait mode, HSP modem software 185 reconfigures host interface 138 to restart periodic interrupts and disconnect signal RING_IN from the interrupt line to host processor 110. Accordingly, the wait mode of HSP modem hardware 120 allows computer system 100 to enter a power-saving mode without losing the HSP modem's ability to receive or initiate new connections via lines 125.

In accordance with a further aspect of the invention, an idle time counter implemented in HSP modem software 185 measures the length of time (e.g. the number of interrupts from HSP modem hardware 120) during which no communication signals are sent or received (i.e., there is no connection) on lines 125 and no data or commands are received from communication application 170. Alternatively, the idle time counter could be implemented in hardware 120. If the idle time counter reaches a threshold count, HSP modem software 185 configures host interface 138 to stop periodic interrupts and select signal RING_IN as the interrupt to host processor 110. The threshold count for the idle time counter may be user programmable for example via a standard modem AT command (e.g., ATS50= 10 which stores the value 10 in modem register number 50) which is input from communication application 170 to modem driver 180 and software 185. HSP modem software 185 allocates storage in main memory 150 to create a software register that permits the user to set a desired delay before hardware 120 is place in wait mode.

In one specific embodiment of the invention, host interface 138 and buffer 136 are part of a single integrated circuit (ASIC) 130 such as a PCT2881 available from PC-tel, Inc. of Milpitas, Calif. Converters 134 are a codec IC such as an ST7546 available from SGS Thompson, and DAA circuit 132 is a standard telephone line interface that isolates the remainder of hardware 120 from high voltages on lines 125. Selection logic 140 includes an AND gate 142 having input terminals coupled to a IDLE mode selection terminal of ASIC 130 and to ring pulse line from DAA circuit 132. When ASIC 130 is idle, signal RING_IN passes through AND gate 142 and an OR gate 144 to interrupt host CPU 110. When ASIC 130 is not idle, the output signal from AND gate 142 is always low and OR gate 144 passes the interrupt signal from the IRQ terminal of ASIC 138 to interrupt host processor 110. Alternatively, logic 140 may be incorporated in ASIC 130.

Figure 2:
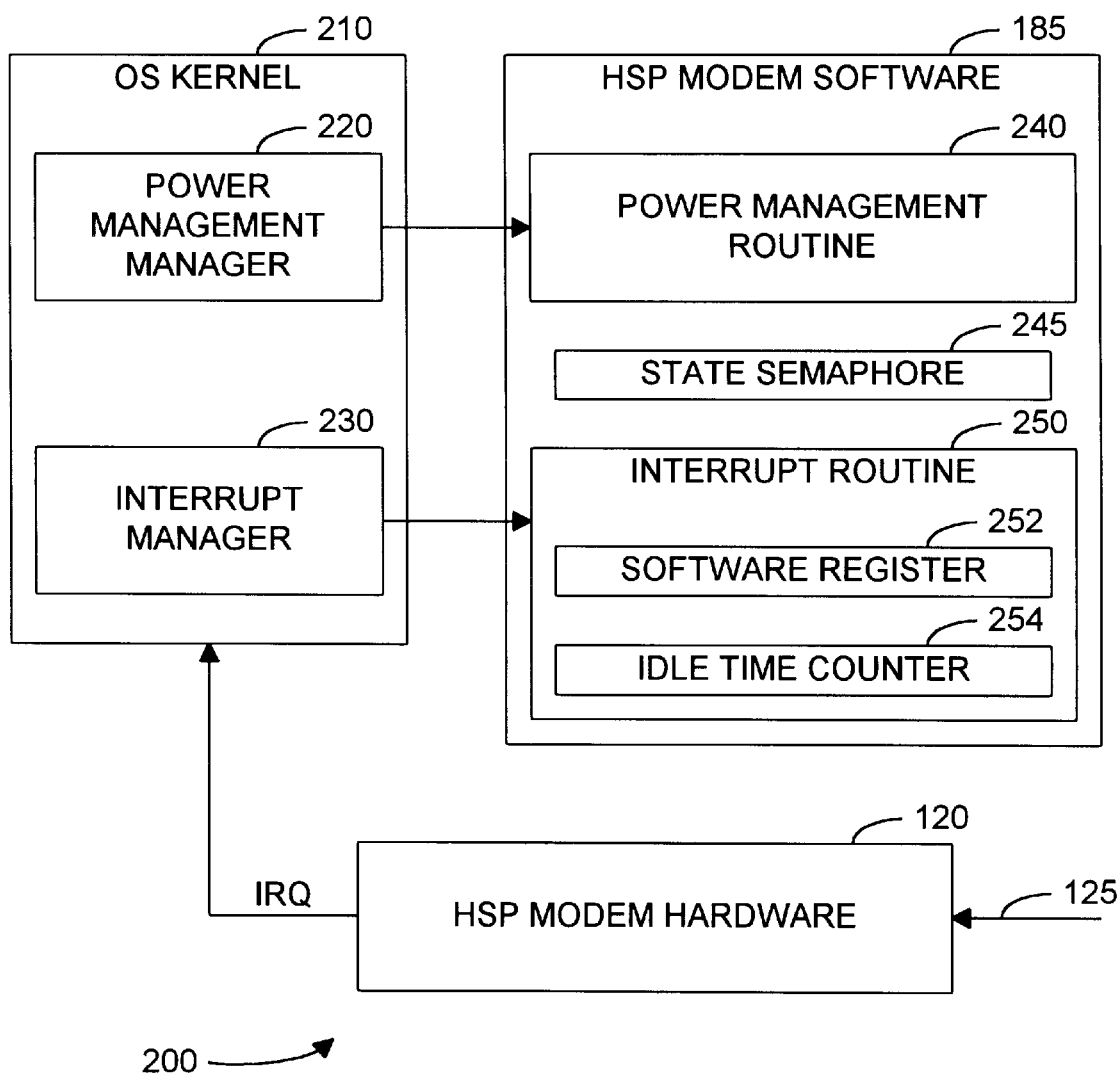
FIG. 2 illustrates interrupt handling in an embodiment of the invention having a normal mode and a power-saving mode for the system and a normal mode and a wait mode for HSP modem hardware.

To further illustrate the operating modes of an HSP modem, FIG. 2 shows a system 200 wherein an operating environment has a kernel 210 including a power management manager 220 and an interrupt manager 230. When system 200 and HSP modem hardware 120 are operating in normal modes, inter from HSP modem hardware 120 cause interrupt manager 230 to initiate execution of an interrupt routine 250 in HSP modem software 185. Interrupt routine 250 contains an idle time counter 254 and a software register 252. Idle time counter 254 counts the number of interrupts serviced with no active modem connection and no intervening data or commands from a communication application. Software register 252 is user programmable via an AT-type modem control command from a communication application and holds a threshold count. If idle time counter 254 reaches the threshold count held in software register 252, interrupt routine 250 places hardware 120 in wait mode by writing to a configuration register and then sets a semaphore 245 to indicate hardware 120 is in wait mode. System 200 will typically be in normal operating mode when HSP modem hardware 120 is placed in wait mode, and system 200 remains in normal mode if there is system activity.

If HSP modem hardware 120 is in wait mode and system 200 is in normal mode when HSP modem hardware 120 receives a ring pulse from lines 125, the ring pulse becomes and interrupt which causes interrupt manager 230 to initiate execution of interrupt routine 250. Interrupt routine 250 determines from semaphore 245 that HSP modem hardware 120 is in wait mode, reconfigures HSP modem hardware 120 for normal mode operation, and clears semaphore 245. System 200 and HSP modem hardware 120 are then both operating in normal mode and can negotiate a modem connection.

If system 200 remains idle while HSP modem 120 is in wait mode, power management manager 220 may place system 200 in a sleep mode. With HSP modem hardware 120 in wait mode and system 200 is in sleep mode, a ring pulse becomes an interrupt that power management manager 220 intercepts. In response to the interrupt, power management manager 220 broadcasts a wake-up signal across system 200 to place system 200 in normal operating mode. A power management routine 240 in HSP modem software 185 receives the wake-up signal. Since the interrupt causing the wake-up signal is a ring signal from HSP modem hardware 120, power management routine 240 clears semaphore 245 and places HSP modem hardware 120 in normal mode. Thus, system 200 and HSP modem hardware 120 are both in normal and able to establish the modem connection. If the wake-up resulted from a source other than HSP modem hardware 120, HSP modem hardware 120 can be left in wait mode while system 200 returns to normal operating mode.

Although the invention has been described with reference to particular embodiments, the description is only an example of the invention's application and should not be taken as a limitation. For example, while the exemplary embodiment of the invention is an HSP modem that is able to respond to an incoming call while being in a power-saving wait mode, similar abilities are of use in computer systems that use the processing power of a host processor for other types of communication systems such as systems implementing speakerphone, videophone, or answering machine functions. In such communication systems, it is desirable to suppress periodic interrupts to the host processor when there is no active communication link but still be able to respond to an incoming communication announced, for example, by a ring signal. In accordance with an aspect of the invention, the ring signal can be connected to wake up or interrupt the host processor when communication hardware is otherwise idled. Various other adaptations and combinations of features of the embodiments disclosed are within the scope of the invention as defined by the following claims.

We claim:

1. A host signal processing communication system comprising:

a host processor;

a device for connection to communication lines, the device being operable in a first mode and a second mode, wherein the device periodically asserts a first signal while operating in the first mode;

software for processing information transferred via the communication lines and the device, the software being executed by the host processor in response to an interrupt signal; and selection logic coupled between the device and the host processor, the selection logic being coupled to select the interrupt signal provided to the host processor, wherein the selection logic selects the first signal as the interrupt signal when the device is operating in the first mode and selects a second signal from the communication lines as the interrupt signal when the device is operating in the second mode.

2. The system of claim 1, wherein the communication lines are telephone lines and the second signal is a ring signal from an adapter coupled to the telephone lines.

3. The system of claim 2, wherein the system comprises a host signal processing modem.

4. The system of claim 1, further comprising a power management system that monitors the interrupt signal to the host processor as an indicator of processor activity and switches the system to a power-saving mode in response to a lack of processor activity.

5. The system of claim 1, further comprising:

means for keeping a count of time during which the communication lines are inactive and no information is transferred to the software; and means for switching the device to the second mode in response to the count reaching a cut-off value.

6. The system of claim 5, wherein the software implements the means for keeping the count.

7. The system of claim 1, wherein the device comprises:

a buffer;

converters coupled to the buffer, wherein the converters convert a first analog signal received on the communication lines to a first set of digital samples and writes the first set of digital samples in the buffer and converts a second set of digital samples in the buffer to a second analog signal transmitted on the communication lines; and a host interface coupled to the buffer and to the host processor, wherein in the host interface provides access for the host processor to read the first set of digital samples from the buffer and write the second set of digital samples to the buffer.

8. A method for operating a communication system, comprising:

generating periodic interrupts to a host processor, wherein a device connected to communication lines generates the periodic interrupts while a communication link is active on the communication lines;

executing a software portion of the communication system in response to the interrupts from the device, wherein the software portion processes information transferred via the active communication link;

suppressing interrupts from the device when no communication link is active on the communication lines; and connecting a signal from the communication lines as an interrupt to the host computer while interrupts from the device are being suppressed.

9. The method of claim 8, further comprising:

switching the host processor from a normal operating mode to a power-saving mode in response to sensing a period without interrupts to the host processor; and switching the host processor back to the normal operating mode in response to the signal from the communication lines interrupting the host processor.

10. The method of claim 9, further comprising resuming generation of the periodic interrupts from the device in response to the signal from the communication lines interrupting the host processor.

11. The method of claim 8, further comprising resuming generation of the periodic interrupts from the device in response to the signal from the communication lines interrupting the host processor.

12. The method of claim 8, wherein connecting the signal from the communication lines as an interrupt to the host computer comprises connecting a ring signal as the interrupt, wherein an adapter coupled to telephone lines generates the ring signal.

13. A host signal processing modem comprising:

a host computer including a host processor and a device bus;

modem hardware coupled to the device bus of the host computer, the modem hardware including:

a device for connection to telephone lines, the device being operable in a first mode and a second mode, wherein the device periodically asserts a first signal while operating in the first mode; and selection logic coupled between the device and the host computer, the selection logic providing an interrupt to the host processor, wherein the selection logic selects the first signal as the interrupt signal when the device is operating in the first mode and selects a second signal from the telephone lines as the interrupt signal when the device is operating in the second mode; and software for processing information transferred from the modem hardware via the device bus, the software being executed by the host processor in response to the interrupt signal from the modem hardware.

14. The host signal processing modem of claim 13, wherein the modem hardware further comprises:

a converter that converts an analog signal received on the telephone lines to a series of samples representing amplitudes of the analog signal; and a buffer for storage of blocks of samples from the converter, and wherein the software executed by the host processor processes samples from the buffer to convert the samples into data.

15. The host signal processing modem of claim 14, wherein the software interprets the samples according to a communications protocol and derives the data from the samples.

* * * * *